(12) United States Patent
Su et al.

(10) Patent No.: US 11,957,987 B2
(45) Date of Patent: Apr. 16, 2024

(54) SMART SPINDLE WITH REPLACEABLE BATTERY, AND SMART RUBIK'S CUBE

(71) Applicant: FS GIIKER TECHNOLOGY CO., LTD., Guangdong (CN)

(72) Inventors: Ziming Su, Foshan (CN); Changping Li, Foshan (CN)

(73) Assignee: FS GIIKER TECHNOLOGY CO., LTD., Foshan (CN)

( * ) Notice: Subject to any disclaimer, the term of this patent is extended or adjusted under 35 U.S.C. 154(b) by 370 days.

(21) Appl. No.: 17/423,552

(22) PCT Filed: Aug. 30, 2019

(86) PCT No.: PCT/CN2019/103768
§ 371 (c)(1),
(2) Date: Jul. 16, 2021

(87) PCT Pub. No.: WO2020/147318
PCT Pub. Date: Jul. 23, 2020

(65) Prior Publication Data
US 2022/0072414 A1     Mar. 10, 2022

(30) Foreign Application Priority Data

Jan. 18, 2019 (CN) .......................... 201910108286.8
Apr. 29, 2019 (CN) .......................... 201910355748.6

(51) Int. Cl.
*A63F 9/08* (2006.01)
*G06F 1/3212* (2019.01)

(52) U.S. Cl.
CPC .......... *A63F 9/0826* (2013.01); *A63F 9/0838* (2013.01); *A63F 9/0842* (2013.01);
(Continued)

(58) Field of Classification Search
CPC .... A63F 9/0842; A63F 9/0838; A63F 9/0826; A63B 43/06
See application file for complete search history.

(56) References Cited

U.S. PATENT DOCUMENTS 4,817,952 A * 4/1989 Biro ...................... A63F 9/0612
273/153 S
5,669,702 A * 9/1997 Wang ...................... F21V 3/023
446/485
(Continued)

FOREIGN PATENT DOCUMENTS

CN         202376734 U        8/2012
CN         106110651 A   *   11/2016 ........... A63F 9/0612
(Continued)

OTHER PUBLICATIONS

Patent Cooperation Treaty: International Search Report and Written Opinion for PCT/CN2019/103768; dated Nov. 6, 2019; 13 pages. (Translation for ISR only).

Primary Examiner — Steven B Wong

(57) ABSTRACT

Disclosed are a smart spindle with a replaceable battery, and a smart Rubik's cube. The smart spindle comprises a core (100), a sensor (200) and a main control module (310), wherein the core (100) comprises a housing (110) with a cavity (111); the main control module (310) is mounted inside the cavity (111); the sensor (200) is electrically connected to the main control module (310); the sensor (200) is mounted at the core (100); the cavity (111) is also used for mounting a battery (400), the housing (110) is provided with a notch (112) for having access to the battery (400), and the notch (112) is in communication with the cavity (111); or, the exterior of the housing (110) is used for mounting the battery (400), and the housing (110) is provided with a through hole (113), such that the cavity (111) is in communication with the exterior of the housing (110)
(Continued)

via the through hole (113). When the power for the smart Rubik's cube is insufficient, a player can remove the used battery and replace same with a fresh battery, such that the smart Rubik's cube can continue to be used immediately, without the need to perform charging and the need to stop use for a period of time, thereby facilitating the use by the player.

11 Claims, 11 Drawing Sheets

(52) U.S. Cl.
CPC .... *G06F 1/3212* (2013.01); *A63F 2250/1063* (2013.01); *A63F 2250/1073* (2013.01)

(56) References Cited

U.S. PATENT DOCUMENTS

| | | | | |
|---|---|---|---|---|
| 5,775,800 | A * | 7/1998 | Hsieh | F21V 33/008 |
| | | | | 362/800 |
| 11,077,359 | B1 * | 8/2021 | Wigh | A63F 9/0842 |
| 11,266,883 | B2 * | 3/2022 | Lanni | A63B 43/004 |
| 2001/0049311 | A1 * | 12/2001 | Lewis | A63B 43/06 |
| | | | | 473/570 |
| 2007/0281811 | A1 * | 12/2007 | Wang | A63B 43/06 |
| | | | | 473/570 |
| 2011/0136604 | A1 * | 6/2011 | Hsu | A63B 41/00 |
| | | | | 473/609 |
| 2015/0159858 | A1 * | 6/2015 | Lin | F21K 9/61 |
| | | | | 362/311.01 |
| 2016/0243410 | A1 * | 8/2016 | Larson | A63B 41/085 |
| 2016/0354646 | A1 * | 12/2016 | Wang | A63B 43/06 |
| 2019/0374849 | A1 * | 12/2019 | Limaye | A63F 9/0612 |

FOREIGN PATENT DOCUMENTS

| | | | | |
|---|---|---|---|---|
| CN | 106512386 A | * | 3/2017 | .......... A63F 9/0826 |
| CN | 206063737 U | | 4/2017 | |
| CN | 106955488 A | * | 7/2017 | |
| CN | 206366169 U | | 8/2017 | |
| CN | 107185226 A | * | 9/2017 | .......... A63F 9/0842 |
| CN | 108479055 A | | 9/2018 | |
| CN | 109675297 A | | 4/2019 | |
| CN | 109966730 A | | 7/2019 | |
| CN | 110180165 A | * | 8/2019 | |
| JP | 2006020899 A | | 1/2006 | |
| KR | 20180067241 A | * | 6/2018 | |
| TW | M487124 U | | 10/2014 | |
| WO | WO-2018138586 A2 | * | 8/2018 | .......... A63F 13/245 |

* cited by examiner

SMART SPINDLE WITH REPLACEABLE BATTERY, AND SMART RUBIK'S CUBE

CROSS-REFERENCE TO RELATED APPLICATIONS

This application is a U.S. National Phase application submitted under 35 U.S.C. § 371 of Patent Cooperation Treaty application serial no. PCT/CN2019/103768, filed Aug. 30, 2019, and entitled SMART SPINDLE WITH REPLACEABLE BATTERY, AND SMART RUBIK'S CUBE, which application claims priority to Chinese patent application serial no. 201910108286.8, filed Jan. 18, 2019, and Chinese patent application serial no. 201910355748.6, filed Apr. 29, 2019.

Patent Cooperation Treaty application serial no. PCT/CN2019/103768, published as WO 2020/147318 A1, and Chinese patent application serial nos. 201910108286.8 and 201910355748.6 are incorporated herein by reference.

TECHNICAL FIELD

The present disclosure relates to a field of smart magic cubes, and in particular, to a battery-replaceable smart center shaft and a smart magic cube.

BACKGROUND

A smart magic cube is a new type of electronic magic cube that senses status and rotation signal of the magic cube in real time through sensors, and processes, stores and sends information such as the real-time status and the rotation signal to external devices. A smart center shaft of the magic cube is the core part of such smart magic cube, which can detect rotation information of each surface of the magic cube, acquire the real-time status of the whole magic cube, and communicate with the electronic devices outside the magic cube in real time. Since the smart magic cube is required to have many functions such as information processing, information storage and communication, the smart magic cube has problems of high power consumption and fast power consumption. It often happens that when the smart magic cube is used only for a short period of time, it needs to be paused for a period of time for charging, resulting in that players have to stop using the smart magic cube. Therefore, the conventional smart magic cube is inconvenient to use.

SUMMARY

Accordingly, it is necessary to provide a battery-replaceable smart center shaft and a smart magic cube to address a problem of use inconvenience. The battery-replaceable smart center shaft can realize a detachable mounting of a battery, without battery charging and without stopping using the smart magic cube for a period of time due to charging, which is convenient for a player to use.

A battery-replaceable smart center shaft includes a core, a sensor, and a main control module. The core includes a housing with a cavity. The main control module is mounted in the cavity. The sensor is electrically connected to the main control module. The sensor is mounted at the core.

A battery is further mounted in the cavity. The housing is provided with a notch for the battery to pass in and out. The notch is in communication with the cavity. Alternatively, the battery is mounted on an exterior of the housing. The housing is provided with a through hole, through which the cavity is in communication with the exterior of the housing.

In the above battery-replaceable smart center shaft, the sensor is configured to detect rotation signals of cube layers of the smart magic cube. The main control module acquires the rotation signals of each of the cube layers via the sensor, and calculates the real-time status of the smart magic cube. The battery is detachably mounted in the cavity or at the exterior of the housing. The battery is electrically connected to the main control module located in the cavity via a conductive member, so as to supply electrical energy to the main control module and other power-consuming components electrically connected to the main control module, and to ensure the normal use of the smart magic cube. When the power of the smart magic cube is low, the player can remove the old battery and replace it with a new battery, so as to continue using the smart magic cube immediately, without battery charging and without stopping using the smart magic cube for a period of time, which is convenient for the player to use.

In an embodiment, the battery-replaceable smart center shaft further includes a conductive member. The conductive member is electrically connected to the battery and the main control module respectively. The battery supplies electrical energy to the main control module via the conductive member.

In an embodiment, a mounting position is provided in the cavity for detachably mounting the battery.

The notch is located directly above the mounting position, such that the battery is capable of being vertically mounted on the mounting position through the notch. Alternatively, the notch is located obliquely above the mounting position, such that the battery is capable of being obliquely mounted on the mounting position through the notch. Alternatively, the notch is located on a same horizontal plane as the mounting position, such that the battery is capable of being horizontally mounted on the mounting position through the notch.

In an embodiment, the battery-replaceable smart center shaft further includes a battery cover movably mounted at the notch. The battery cover is capable of opening or closing the notch.

In an embodiment, the notch is located obliquely above the mounting position. An abutting bevel is provided on a side of the battery cover adjacent to the cavity. During a process of the battery cover closing the notch, the abutting bevel abuts against the battery, such that the battery slides along the abutting bevel to the mounting position.

In an embodiment, the battery cover is provided with a first flat surface. When the battery cover closes the notch, the first flat surface abuts against an end surface of the battery.

In an embodiment, the notch is located obliquely above the mounting position. An inner wall of the housing or the conductive member is provided with a first elastic sheet. The first elastic sheet drives the battery to move from the mounting position to the notch.

In an embodiment, an inner wall of the housing is provided with a slot. The conductive member is detachably mounted in the slot.

In an embodiment, a side wall of the slot is provided with a clamping block. The clamping block and another side wall of the slot jointly clamp the conductive member.

In an embodiment, the conductive member is provided with a supporting portion and a second elastic sheet for conducting electricity. A top end of the second elastic sheet is provided with an elastic portion for abutting against the main control module or the battery. A height of a top end of the supporting portion is within an elastic moving range of the elastic portion.

In an embodiment, the battery-replaceable smart center shaft further includes the battery. The battery is detachably mounted in the cavity through the notch. The cavity is a spherical cavity. The battery is mounted in a middle of the spherical cavity.

In an embodiment, the battery-replaceable smart center shaft further includes the battery. The battery is detachably mounted in the cavity through the notch. The battery is a button battery.

A magic cube includes blocks and the battery-replaceable smart center shaft as described above. The blocks are mounted on the battery-replaceable smart center shaft. The blocks match with each other to form a plurality of cube layers. The sensor is configured to detect rotation signals of the cube layers.

When the above magic cube is used, the battery is detachably mounted in the cavity or at the exterior of the housing. The battery supplies electrical energy to the main control module and other power-consuming components electrically connected to the main control module, to ensure the normal use of the smart magic cube. When the power of the smart magic cube is low, the player can remove the old battery and replace it with a new battery, so as to continue using the smart magic cube immediately, without battery charging and without stopping using the smart magic cube for a period of time, which is convenient for the player to use.

REFERENCE NUMBERS

Figure 1:
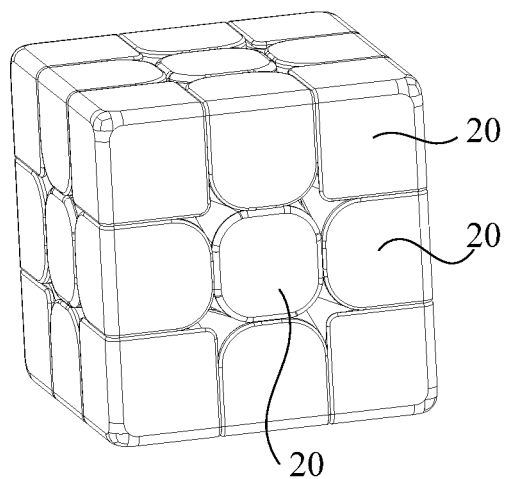
FIG. 1 is a structural schematic view of a smart magic cube according to a first embodiment of the present disclosure.

100—core, 110—housing, 111—cavity, 112—notch, 113—through hole, 114—mounting position, 115—slot, 116—clamping block, 117—first half-housing, 118—second half-housing, 119—second flat surface, 1120—mounting groove, 120—connecting rod, 200—sensor, 210—stator of the contact sensor, 211—common signal ring, 212—angle signal ring, 220—rotor of the contact sensor, 221—first electric contact pin, 222—second electric contact pin, 310—main control module, 320—buzzer, 400—battery, 500—conductive member, 510—first elastic sheet, 520—supporting portion, 530—second elastic sheet, 531—elastic portion, 600—battery cover, 610—abutting bevel, 620—first flat surface, 700—fastener, 20—cube.

DETAILED DESCRIPTION

In order to facilitate the understanding of the present disclosure, the present disclosure will be described more fully below with reference to the relevant drawings. Preferred embodiments of the present disclosure are shown in the drawings. However, the present disclosure can be implemented in many different forms and is not limited to the embodiments described herein. On the contrary, the purpose of providing these embodiments is to have a more thorough and comprehensive understanding of the disclosure of the present invention.

It should be noted that when an element is referred to as being "fixed on" another element, it can be directly on another element or intervening elements may be present therebetween. When an element is referred to as being "connected" or "coupled" to another element, it can be directly connected or coupled to the other element or intervening elements may be present therebetween. On the contrary, when an element is referred to as being "directly on" another element, there are no intervening elements. Terms "vertical", "horizontal", "left", "right" and similar expressions used herein are for illustrative purposes only. Terms "first" and "second" in the present disclosure do not represent a specific number and order, but are only used to distinguish names.

First Embodiment

Figure 2:
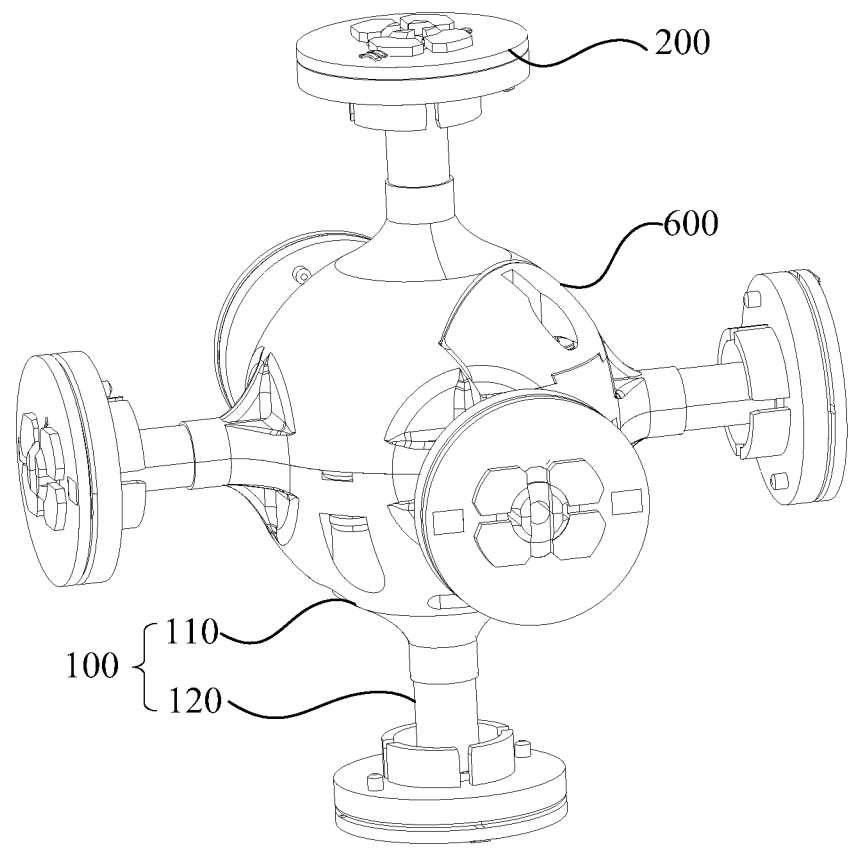
FIG. 2 is a structural schematic view of a battery-replaceable smart center shaft of the smart magic cube as shown in FIG. 1.

FIG. 1 shows a structural schematic view of a smart magic cube according to a first embodiment of the present disclosure. Referring to FIGS. 1 and 2, the smart magic cube includes blocks 20 and a battery-replaceable smart center shaft. The blocks 20 are mounted on the battery-replaceable smart center shaft. The blocks 20 match with each other to form a plurality of cube layers. The blocks 20 include one or more of center blocks, corner blocks, or edge blocks. The smart magic cube can be a second-order magic cube, a third-order magic cube, a high-order magic cube, or a special-shaped magic cube.

Figure 3:
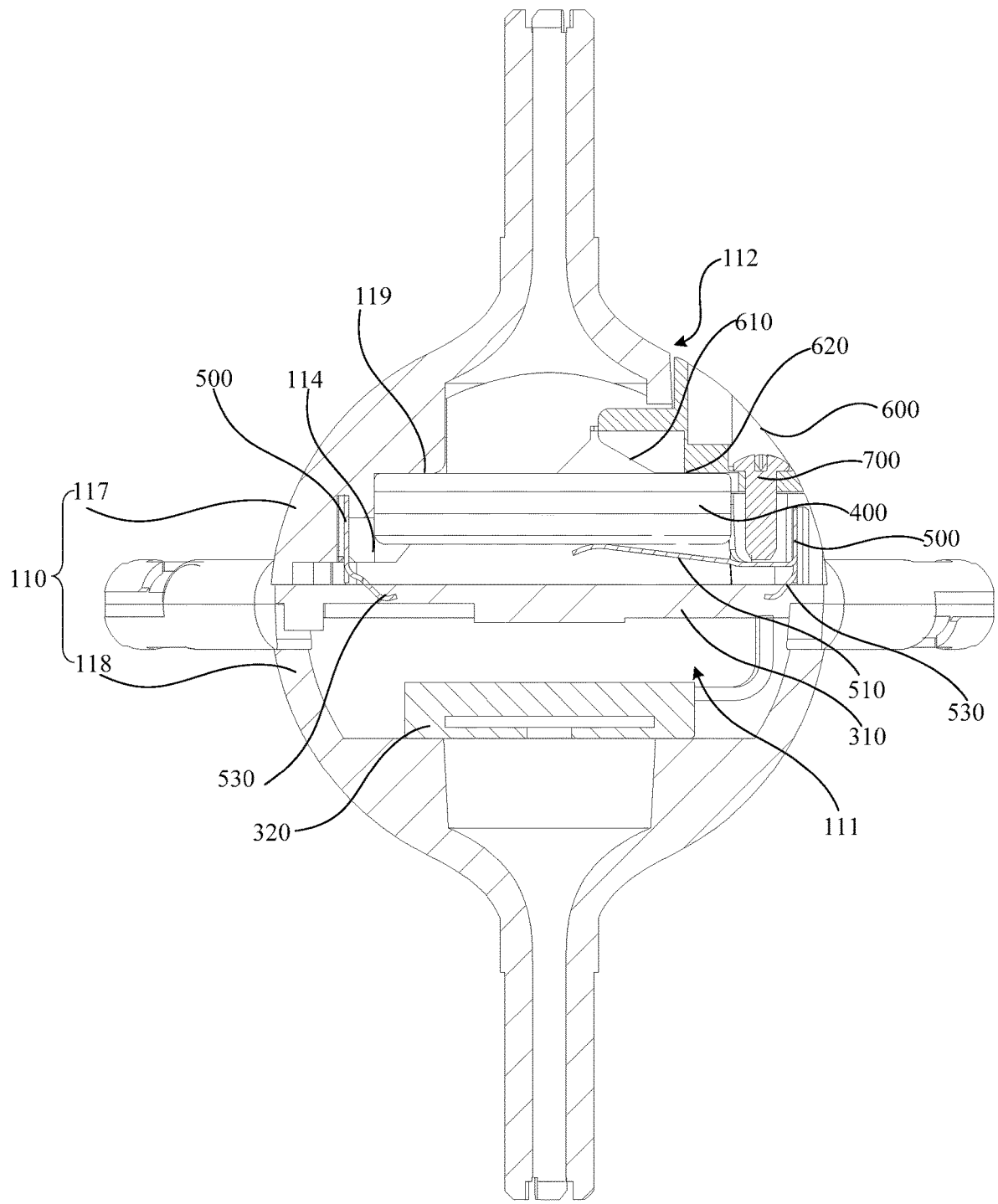
FIG. 3 is a schematic view illustrating an internal structure of the smart center shaft as shown in FIG. 2.

Referring to FIG. 3 together with previous figures, the above battery-replaceable smart center shaft includes a core 100, a sensor 200, and a main control module 310. The core 100 includes a housing 110 with a cavity 111. The main control module 310 is mounted in the cavity 111. The sensor 200 is electrically connected to the main control module 310. The sensor 200 is mounted at the core 100. The sensor 200 is configured to detect rotation signals of the cube layers. A battery 400 is further mounted in the cavity 111. The housing 110 is provided with a notch 112 allowing the battery 400 to pass in and out. The notch 112 is in communication with the cavity 111.

In the above battery-replaceable smart center shaft, the sensor 200 is configured to detect the rotation signals of the cube layers of the smart magic cube. The main control module 310 acquires the rotation signals of each of the cube layers via the sensor 200, and calculates the real-time status of the smart magic cube. The battery 400 is detachably mounted in the cavity 111. The battery 400 is electrically connected to the main control module 310 located in the cavity 111, and thus supplies electrical energy to the main control module 310 and other power-consuming components electrically connected to the main control module 310, so as to ensure the normal use of the smart magic cube. When the power of the smart magic cube is low, a player can remove the old battery 400 and replace it with a new battery 400, so as to continue using the smart magic cube immediately, without battery charging it and without stopping using the smart magic cube for a period of time, which is convenient for the player to use.

In addition, if a center shaft of a conventional smart magic cube is required to have a charging function, it is necessary to be equipped with a complex external charging structure and device, while a complex charging protection circuit and a remaining power identification circuit are required to be formed in the center shaft, which leads to relatively high self-leakage of power source, small capacity, short battery life. As a result, the center shaft is not only costly, but also difficult to be manufactured. However, the battery-replaceable smart center shaft according to the present disclosure can greatly simplify the overall structure, and reduce the processing and manufacturing cost of the center shaft of the magic cube.

Specifically, referring to FIG. 3, the battery-replaceable smart center shaft further includes the battery 400. The battery 400 is detachably mounted in the cavity 111 through the notch 112. Due to the limited internal space of the smart center shaft, a size of the battery 400 is limited. Accordingly, the capacity of the battery 400 is limited. By replacing the battery 400, the use time of the smart center shaft can be increased, which is convenient for the player to use.

The cavity 111 is a spherical cavity (for example, the cavity 111 is in a standard spherical shape or a spherical-like shape). The battery 400 is mounted in a middle of the spherical cavity. Since the middle of the spherical cavity is large in size, it can accommodate a large-sized battery 400. Accordingly, the size of the battery 400 can be designed to be larger, and the capacity of the battery 400 can be increased accordingly, which can improve the battery life of the smart center shaft and reduce the frequency of replacing the battery 400, and facilitate the player to use. Optionally, the size of the battery 400 is adapted to the size of the middle of the spherical cavity, so as to maximize the size of the battery 400 and increase the capacity of the battery 400.

Specifically, the battery 400 is a large-capacity battery. The battery 400 may be a button battery, a graphene battery, or a rechargeable lithium battery. The large-capacity battery can increase the battery life of the smart center shaft, reduce the frequency of replacing the battery 400, which is convenient for the player to use and improves use comfort. In addition, the battery 400 is selected as a button battery. The button battery has mature technology, stable quality, and is easy to be transported and stored, especially in the long-term sea transportation process, which can ensure the safety of the transportation process. In addition, the cost of the button battery is lower, which can further reduce the cost of the smart center shaft. Comparatively speaking, the button battery has a large capacity and has a size that is adapted to the spherical cavity, such that the space of the spherical cavity can be utilized as much as possible, and thus the volume of the button battery itself can be increased to increase the capacity of the button battery.

On the basis of the foregoing embodiments, referring to FIGS. 3, 4, 7, 9 and 10, the battery-replaceable smart center shaft further includes a conductive member 500. The conductive member 500 is electrically connected to the battery 400 and the main control module 310 respectively. The battery 400 supplies electrical energy to the main control module 310 via the conductive member 500. The conductive member 500 may be a metal sheet or a conductive wire.

Figure 4:
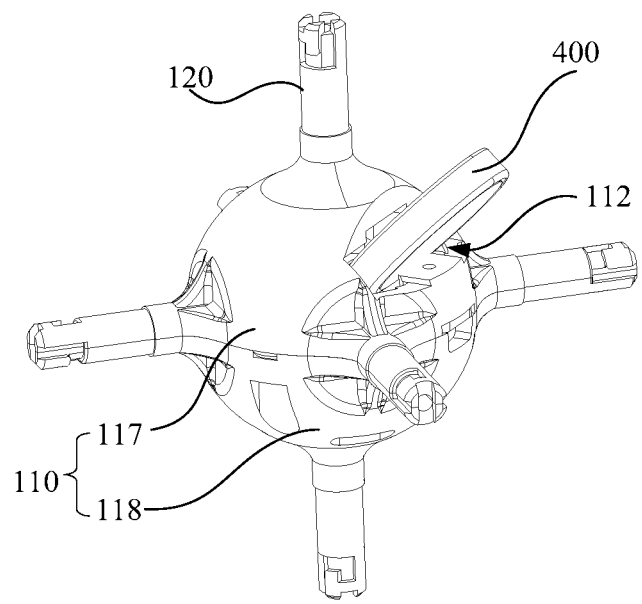
FIG. 4 is a first schematic view of a battery of the smart center shaft as shown in FIG. 2 when being mounted.

Specifically, referring to FIGS. 3 and 4, a mounting position 114 is provided in the cavity 111. The battery 400 is detachably mounted on the mounting position 114. It can be understood that the mounting position 114 may be a relatively independent chamber structure located in the cavity 111, or may be a supporting step or other supporting structure located in the cavity 111, so as to realize the detachable placement of the battery 400.

Figure 5:
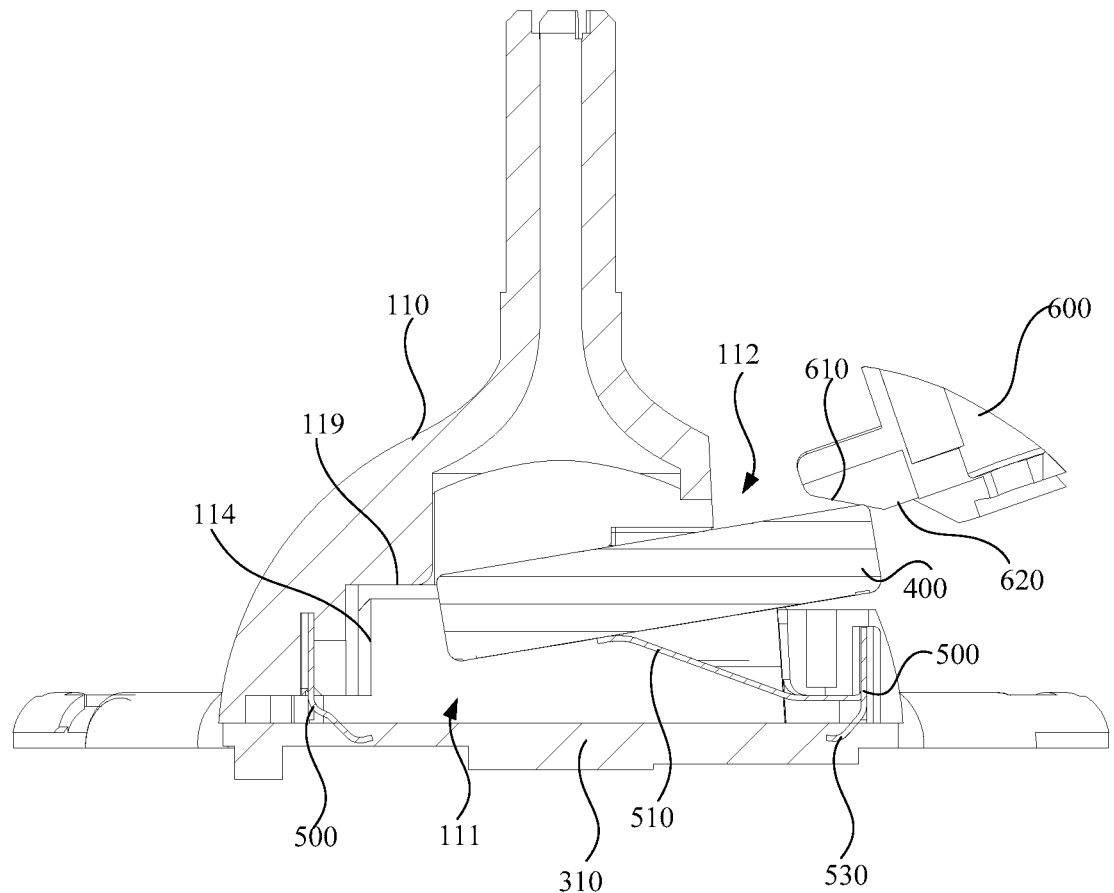
FIG. 5 is a second schematic view of the battery of the smart center shaft as shown in FIG. 2 when being mounted.
Figure 6:
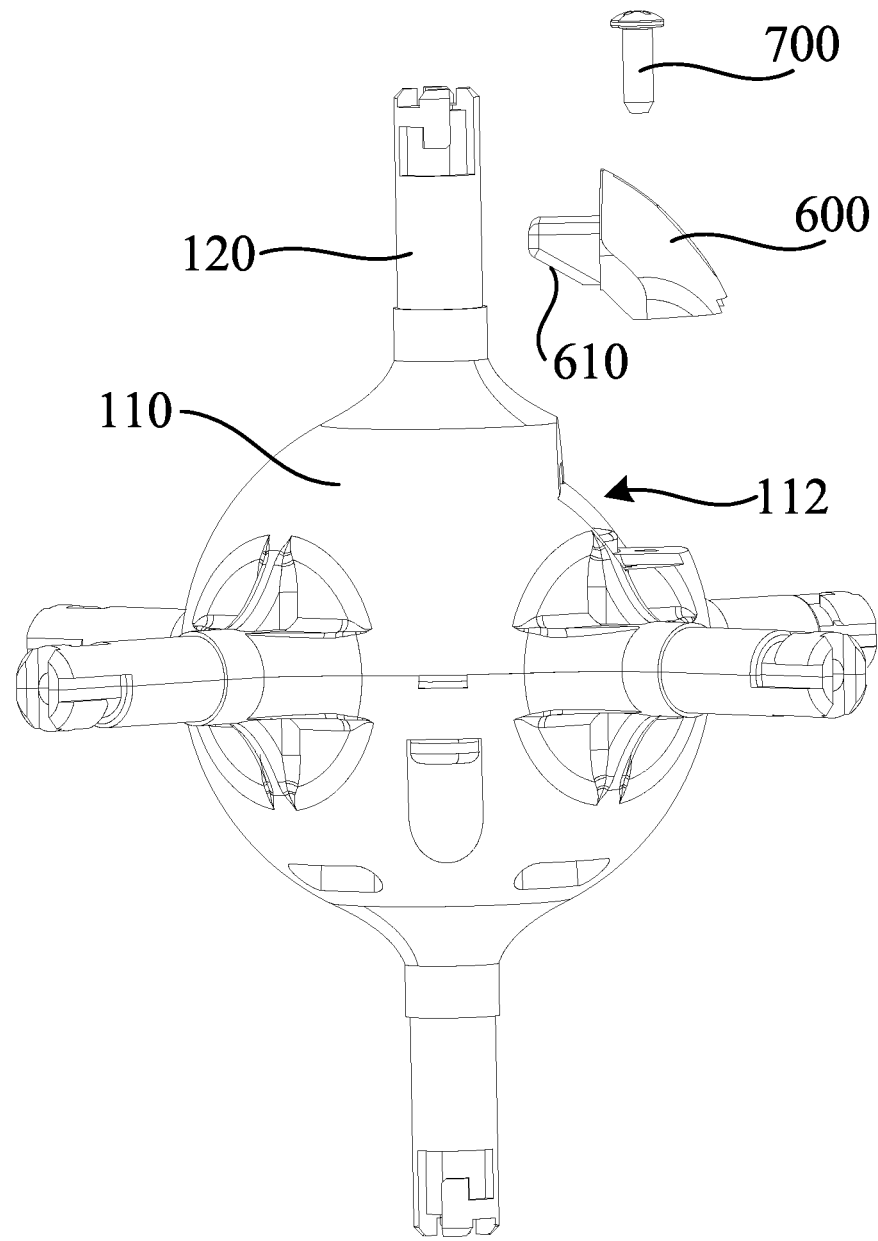
FIG. 6 is a schematic view of a battery cover of the smart center shaft as shown in FIG. 2 when being connected.

Further, referring to FIGS. 5 and 6 together with other figures, the notch 112 is located obliquely above the mounting position 114 such that the battery 400 can be obliquely mounted on the mounting position 114 through the notch 112. Referring to FIG. 1, in the smart magic cube, a plurality of blocks 20 are mounted on an exterior of the housing 110. When the mounting position 114 is located in the middle of the cavity 111 (especially when the cavity 111 is a spherical cavity, since the middle of the spherical cavity is large in size, it can accommodate a large-size and large-capacity battery 400), if the notch 112 is located obliquely above the mounting position 114, only a few blocks 20 located on an upper layer of the smart magic cube need to be disassembled, and the notch 112 can be exposed, which is convenient for the player to replace the battery 400.

It can be understood that, in other embodiments, the notch 112 may optionally be located directly above the mounting position 114 (see the Third Embodiment 3 below), such that the battery 400 can be vertically mounted on the mounting position 114 through the notch 112. Alternatively, the notch 112 may optionally be located on the same horizontal plane as the mounting position 114, such that the battery 400 can be horizontally mounted on the mounting position 114 through the notch 112 (see the Fourth Embodiment below).

Furthermore, referring to FIG. 3, the battery-replaceable smart center shaft further includes a battery cover 600. The battery cover 600 is movably mounted at the notch 112. The battery cover 600 can open or close the notch 112. After the battery 400 is replaced, the battery cover 600 closes the notch 112 to protect the battery 400, the main control module 310 and other components in the cavity 111. It can be understood that in other embodiments, the battery cover 600 may not be provided at the notch 112. Since the battery 400 is detachably and stably mounted at the mounting position 114, for example, fixed at the mounting position 114 through bonding, snap-fitting, or the like, the notch 112 may not be closed, and the battery 400 will not fall out, which will not affect the normal use of the smart magic cube.

Optionally, referring to FIG. 6, the battery cover 600 is detachably mounted at the notch 112. For example, the battery cover 600 is mounted on the housing 110 by a fastener 700 to close the notch 112. Of course, the battery cover 600 can also be screwed or snap-connected to the housing 110. It can be understood that, in other embodiments, the battery cover 600 may also be flippable mounted at the notch 112 (similar to a hinged mounting of a door), or may be rotatably mounted at the notch 112, or may be retractably mounted at the notch 112 (see FIG. 14).

On the basis of the foregoing embodiments, referring to FIGS. 3 and 5, the notch 112 is located obliquely above the mounting position 114, an abutting bevel 610 is provided on a side of the battery cover 600 adjacent to the cavity 111. During a process of the battery cover 600 closing the notch 112, the abutting bevel 610 abuts against the battery 400, such that the battery 400 slides along the abutting bevel 610 to the mounting position 114. During a process of obliquely mounting the battery 400, the battery 400 cannot be attached to the mounting position 114 after passing through the notch 112. In this way, during the process of the battery cover 600 closing the notch 112, the abutting bevel 610 of the battery cover 600 can abut against the battery 400 and push the battery 400 to move down, such that the battery 400 slides along the abutting bevel 610 to the mounting position 114 and falls on the mounting position 114 smoothly and accurately, which is convenient for the player to replace the battery 400.

Specifically, referring to FIGS. 3 and 5, the battery cover 600 is provided with a first flat surface 620. When the battery cover 600 closes the notch 112, the first flat surface 620 abuts against an end surface of the battery 400. The battery 400 is supported by the first flat surface 620 of the battery cover 600 after being mounted at the mounting position 114, and thus the battery 400 can be mounted in the cavity 111 more stably, ensuring good contact between the battery 400 and the conductive member 500, and improving the use comfort.

Figure 8:
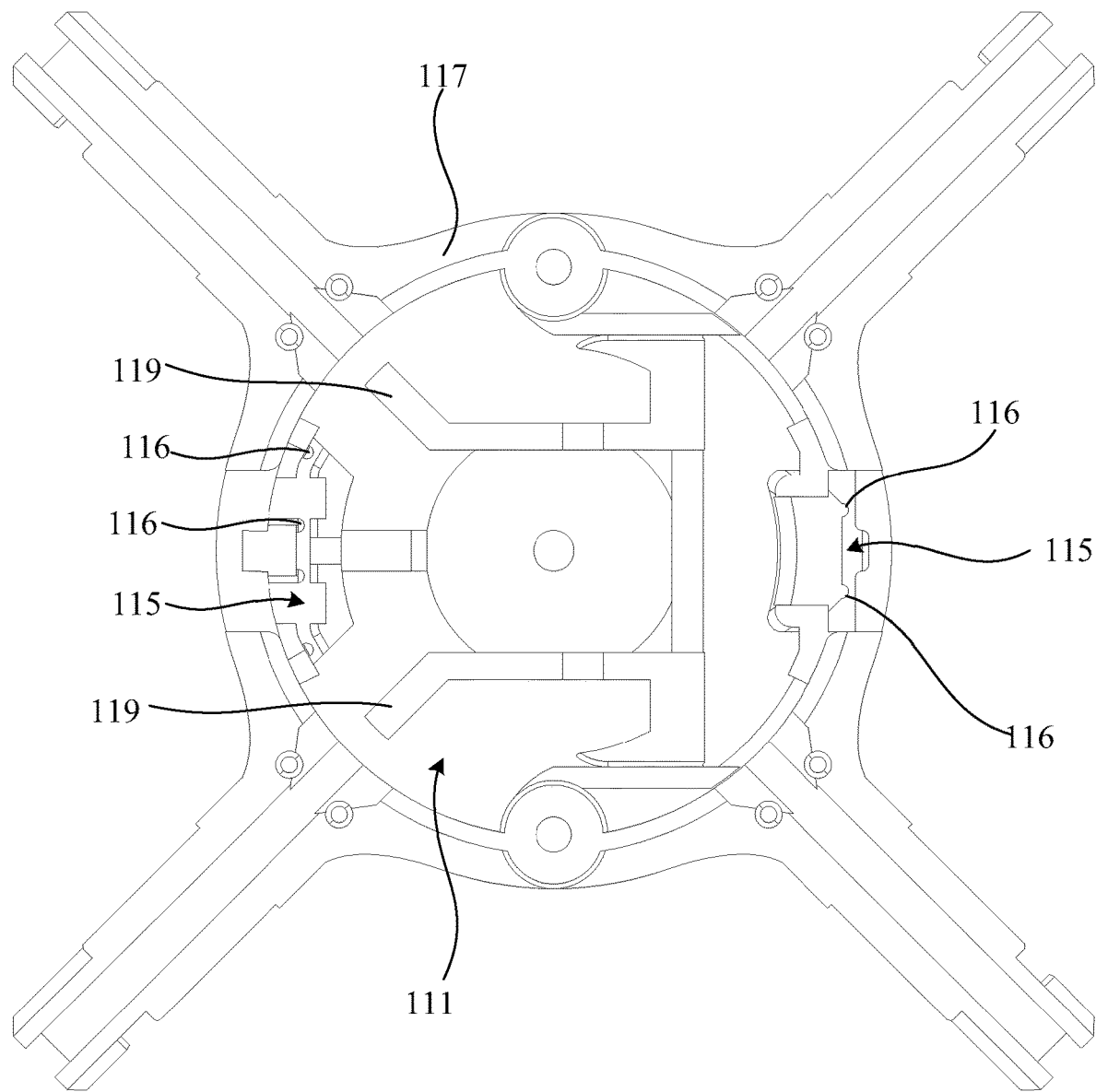
FIG. 8 is a structural schematic view of a first half-housing of the smart center shaft as shown in FIG. 7.

In addition, as shown in FIG. 3, the housing 110 includes a first half-housing 117 and a second half-housing 118 that are connected to each other. The first half-housing 117 and the second half-housing 118 are detachably connected (specifically, connected by screws) to form a cavity 111 to facilitate the mounting of the main control module 310. The first half-housing 117 is provided with the mounting position 114 and the notch 112. Referring to FIG. 8, an inner wall of the housing 110 is further provided with a second flat surface 119. The second flat surface 119 abuts against the end surface of the battery 400. In this way, the battery 400 is supported by the first flat surface 620 and the second flat surface 119 simultaneously after being mounted at the mounting position 114, and thus the battery 400 can be mounted in the cavity 111 more stably. The first flat surface 620 and the second flat surface 119 are attached to the end surface of the battery 400. When the end surface of the battery 400 is a flat surface, the first flat surface 620 and the second flat surface 119 are located on the same horizontal plane.

Specifically, referring to FIGS. 3, 4, 5, 7 and 9, the notch 112 is located obliquely above the mounting position 114. The inner wall of the housing 110 or the conductive member 500 is provided with a first elastic sheet 510. The first elastic sheet 510 drives the battery 400 to move from the mounting position 114 to the notch 112. In this way, when the battery 400 is mounted in an oblique manner, the first elastic sheet 510 can push the battery 400 from the mounting position 114 to the notch 112, thereby facilitating the player to take out the battery 400 from the notch 112, and facilitating the replacement of the battery 400, which is convenient for the player to use and improves use comfort. When the conductive member 500 is provided with the first elastic sheet 510, the first elastic sheet 510 may be selected as a conductive elastic sheet or an insulating elastic sheet (for example, a plastic elastic sheet). When the first elastic sheet 510 is a conductive elastic sheet, the first elastic sheet 510 and the battery 400 are in an elastic contact and abut against each other, thereby ensuring a good contact between the conductive member 500 and the battery 400.

In addition, during the process of the battery cover 600 closing the notch 112, the abutting bevel 610 can push the battery 400 to overcome the elastic force of the first elastic sheet 510 and to be smoothly mounted on the mounting position 114.

Figure 7:
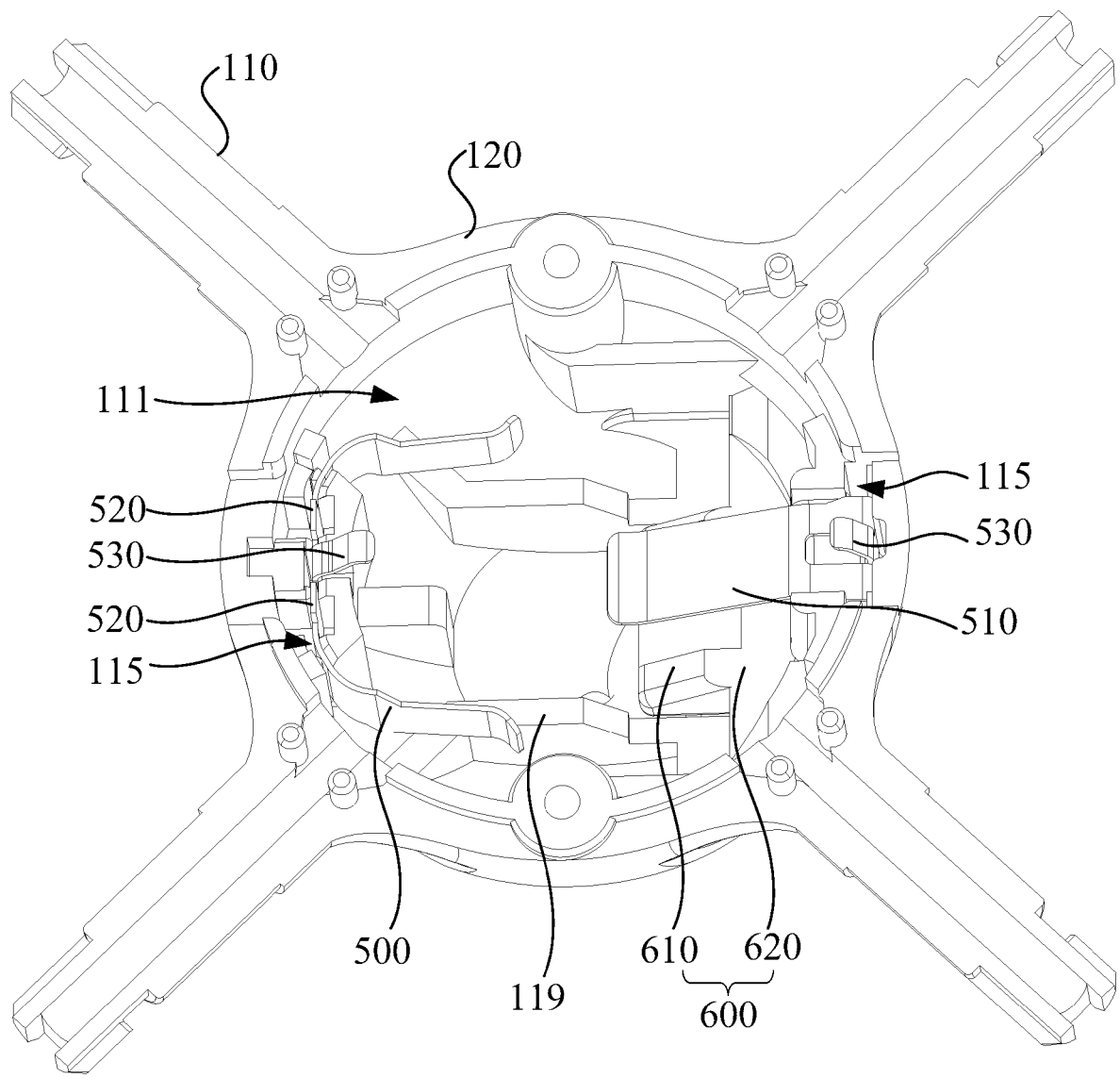
FIG. 7 is a schematic view of conductive members of the smart center shaft as shown in FIG. 3 when being mounted.

On the basis of the foregoing embodiments, referring to FIGS. 3, 7 and 8, the inner wall of the housing 110 is provided with a slot 115. The conductive member 500 is detachably mounted in the slot 115. The conductive member 500 is inserted into the inner wall of the housing 110, which is convenient for disassembly and assembly thereof, and the connection between the conductive member 500 and the housing 110 is tight.

Two conductive members 500 are provided. An end of one of the conductive members 500 is in contact with a positive electrode of the battery 400, and the other end thereof is in contact with the main control module 310. An end of the other conductive member 500 is in contact with a negative electrode of the battery 400, and the other end thereof is in contact with the main control module 310. The battery 400, the main control module 310 and the two conductive members 500 form a circuit loop.

Specifically, referring to FIGS. 7 and 8, a side wall of the slot 115 is provided with a clamping block 116. The clamping block 116 and another side wall of the slot 115 jointly clamp the conductive member 500. In this way, a width of the slot 115 does not need to match a thickness of the conductive element 500 accurately, and the width dimension of the slot 115 can be designed to be larger. The slot 115 with a larger width dimension is easy to be manufactured, and a damage to mold during the stamping and manufacturing process of the narrow slot 115 is avoided. Two or more clamping blocks 116 may be provided. The two or more clamping blocks 116 are disposed on the slot 115 at intervals.

Figure 9:
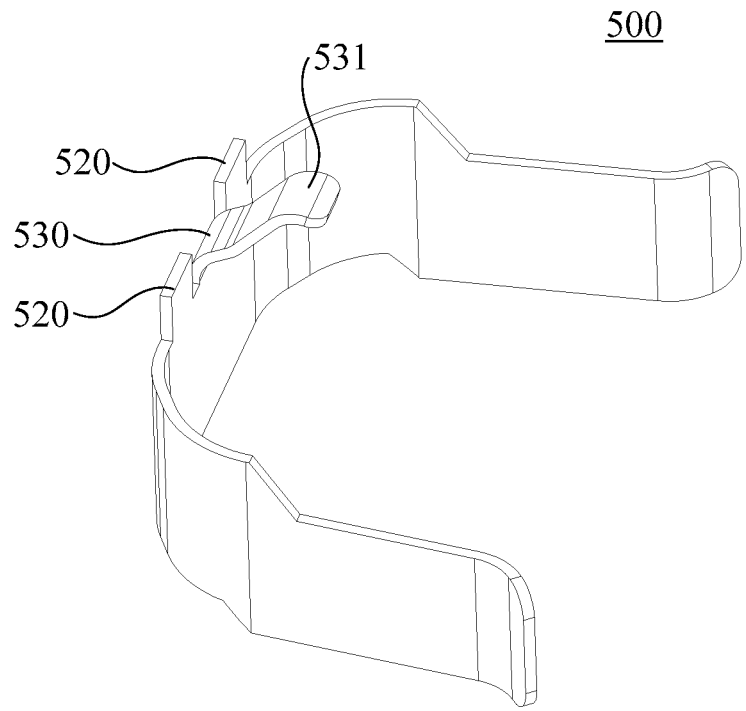
FIG. 9 is a structural schematic view of one of the conductive members of the smart center shaft as shown in FIG. 7.
Figure 10:
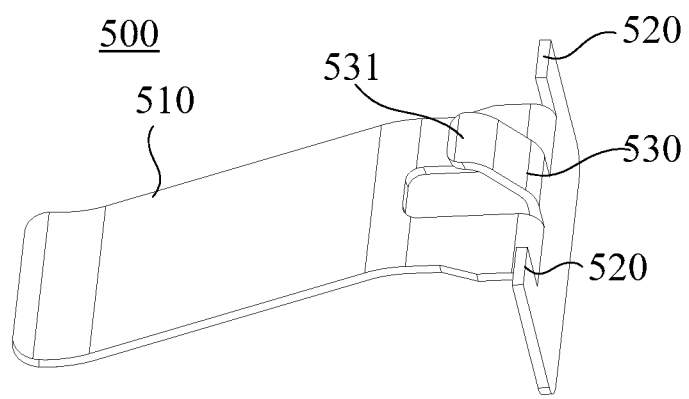
FIG. 10 is a structural schematic view of the other conductive member of the smart center shaft as shown in FIG. 7.

Specifically, referring to FIGS. 7, 9 and 10, the conductive member 500 is provided with a supporting portion 520 and a second elastic sheet 530 for conducting electricity. A top end of the second elastic sheet 530 is provided with an elastic portion 531 for abutting against the main control module 310 or the battery 400. The elastic portion 531 is configured to achieve good electrical conduction between the conductive element 500 and the main control module 310 or the battery 400. A height of a top end of the supporting portion 520 is within an elastic moving range of the elastic portion 531. In this way, when the main control module 310 or the battery 400 abuts against the elastic portion 531, the elastic portion 531 elastically moves, thereby ensuring good contact between the second elastic sheet 530 and the main control module 310 or the battery 400. In addition, the height of the top end of the supporting portion 520 is within the elastic moving range of the elastic portion 531, which can prevent the elastic portion 531 from being deformed excessively, and prevent the elastic portion 531 from being deformed plastically and thus from losing the elastic force. For example, when the main control module 310 abuts against the elastic portion 531 and continues to press the elastic portion 531, the main control module 310 will abut against the supporting portion 520, which prevents the elastic portion 531 from being further deformed. The main control module 310 abuts against the supporting portion 520, which drives the entire conductive element 500 to move as a whole, and can also push the conductive element 500 to be smoothly mounted in position in the slot 115.

On the basis of the foregoing embodiments, the sensor 200 may be mounted on the core 100 in many ways. The sensor 200 may be mounted in the inside, exterior, or inner wall of the housing 110. When the core 100 includes a connecting rod 120, the sensor 200 can also be optionally mounted on the connecting rod 120.

Figure 11:
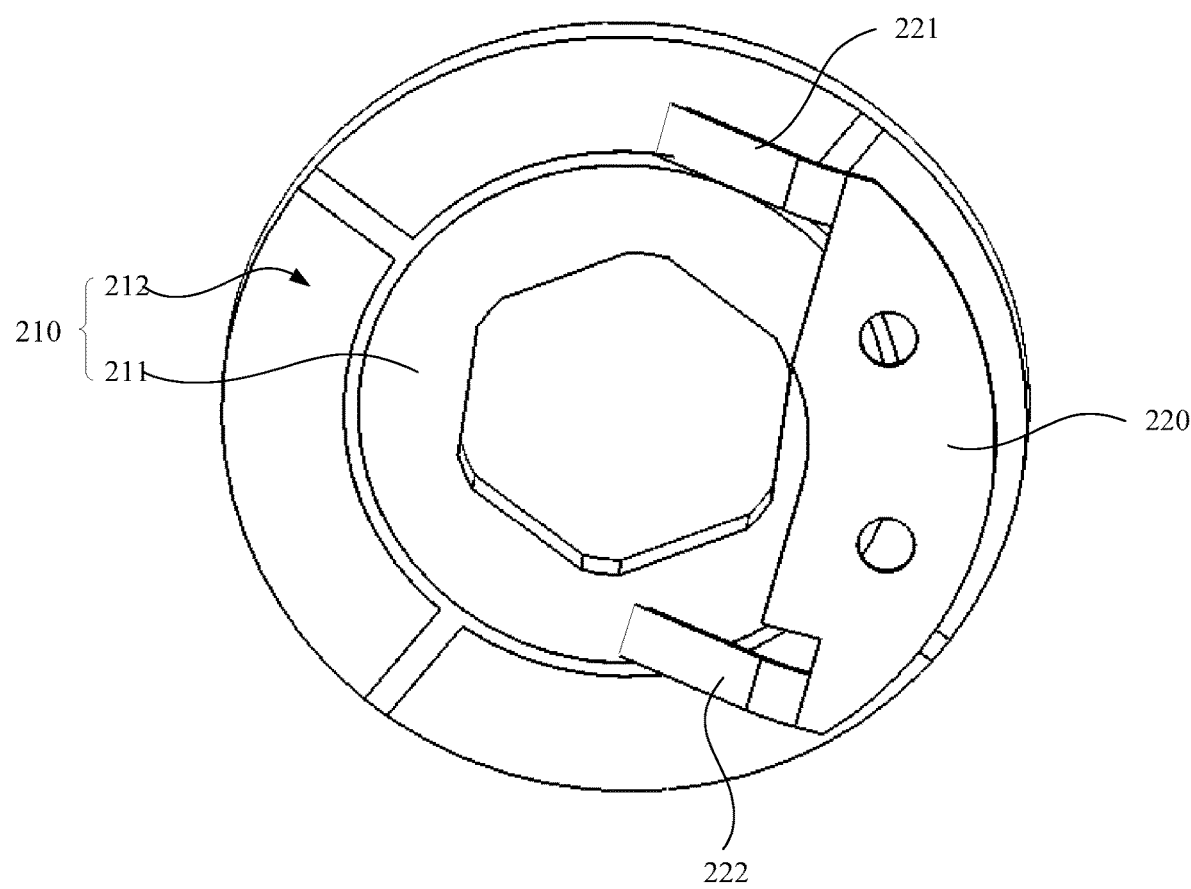
FIG. 11 is a structural schematic view of a sensor of the smart center shaft as shown in FIG. 2.

Referring to FIGS. 2 and 11, specifically, the sensor 200 includes a stator and a rotor. The stator is mounted on the core 100, and the rotor is configured to rotate synchronously with the cube layers of the smart magic cube, such that the rotor can rotate with the cube layers relative to the stator, and thus the sensor 200 can acquire the rotation signals of the cube layers. The main control module 310 calculates a status signal of the magic cube according to the rotation signals of the cube layers. The status signal is used to characterize the relative position relationship between the blocks 20 in the magic cube, that is, the magic cube is smart.

The sensor 200 can be selected as one of a contact sensor, an electromagnetic sensor, and a photoelectric sensor.

Referring to FIG. 11, the stator 210 of the contact sensor includes a common signal ring 211 and an angle signal ring 212 that is coaxial to and insulated from the common signal ring 211. A rotor 220 of the contact sensor is a conductive element. The conductive element includes a first electric contact pin 221 and a second electric contact pin 222. The first electric contact pin 221 is configured to contact the common signal ring 211. The second electric contact pin 222 is configured to contact different positions of the angle signal ring 212 when the cube layers of the smart magic cube is rotated, so as to acquire the rotation signals of the cube layers. When the cube layers are rotated, the first electric contact pin 221 is always pressed against and maintained in contact with the common signal ring 211, and the first electric contact pin 221 and the common signal ring 211 can slide relative to each other. The second electric contact pin 222 is always pressed against and maintained in contact with the angle signal ring 212, and the second electric contact pin 222 and the angle signal ring 212 can slide relative to each other. The rotor 220 of the contact sensor rotates with the cube layers, and the position of the conductive element on the rotor 220 of the contact sensor is changed, such that the connection relationship between the common signal ring 211 and the angle signal ring 212 of the contact sensor 200 is changed. In this way, different signals can be generated, and the main control module 310 can sense the rotation signals of the cube layers.

For an electromagnetic sensor, the rotor of the electromagnetic sensor includes a plurality of magnets. Magnetic field strengths of the magnets are different from each other. The stator of the electromagnetic sensor is a magnetic sensitive sensor. The magnetic sensitive sensor can be selected as a Hall sensor, a magneto sensitive diode, a magneto sensitive resistor, an application specific integrated circuit or the like. When the rotatable cube layer of an inner layer or the rotatable cube layer of an outer layer is rotated, the magnetic sensitive sensor generates different voltages when passing through different magnets. According to the different voltages, the rotation signals of the cube layer are acquired.

For the photoelectric sensor, a rotor of the photoelectric sensor includes a light source and a baffle mounted under the light source. The baffle is provided with a light opening. A stator of the photoelectric sensor includes a plurality of light receivers. When the baffle rotates with the rotatable cube layer of the inner layer or the rotatable cube layer of the outer layer, the light opening is rotated to align with different light receivers, and the light receivers can receive the light from the light source and acquire the rotation signals of the cube layer.

Further, referring to FIG. 3, an output module and/or a movement sensing module are further mounted in the housing 110.

The output module is electrically connected to the main control module 310. The main control module 310 drives the output module to generate a corresponding output mode according to the status signal of the smart magic cube, so as to increase the interaction between the magic cube and the player. For example, the main control module 310 acquires which of situational modes, such as a start-up mode, a recovery completion mode, or an alarm mode for insufficient remaining time, the smart magic cube is in, according to the status signal of the smart magic cube. The output module can be selected as a light emitting element, a sounding element, or a vibrating element. The sounding element may be selected as a buzzer 320. The light emitting element uses light to express a specific situational mode. The vibrating element can be selected as an electromechanical driving element. The electromechanical driving element uses vibration to express a specific situational mode.

The movement sensing module is electrically connected to the main control module 310. The movement sensing module is configured to turn on or off the main control module 310, and to sense the overall moving amount and overall flip angle of the smart magic cube. Optionally, the movement sensing module is an acceleration sensor, a vibration switch, or a touch switch. When the smart magic cube is picked up by the player, the movement sensing module turns on the main control module 310 such that the main control module 310 starts to work. When the smart magic cube is put down by the player, the movement sensing module turns off the main control module 310, such that the main control module 310 enters a dormant state.

In addition, when the movement sensing module is an acceleration sensor, a geomagnetic sensor or a gyroscope, the movement sensing module can sense the overall moving amount and overall flip angle of the smart magic cube, and then sense a real-time spatial posture of the smart magic cube, such that the player can observe the real-time spatial posture of the smart magic cube from the same perspective through a display.

Second Embodiment

The difference between the second embodiment and the first embodiment is that the battery 400 is mounted at an exterior of the housing 110.

Figure 12:
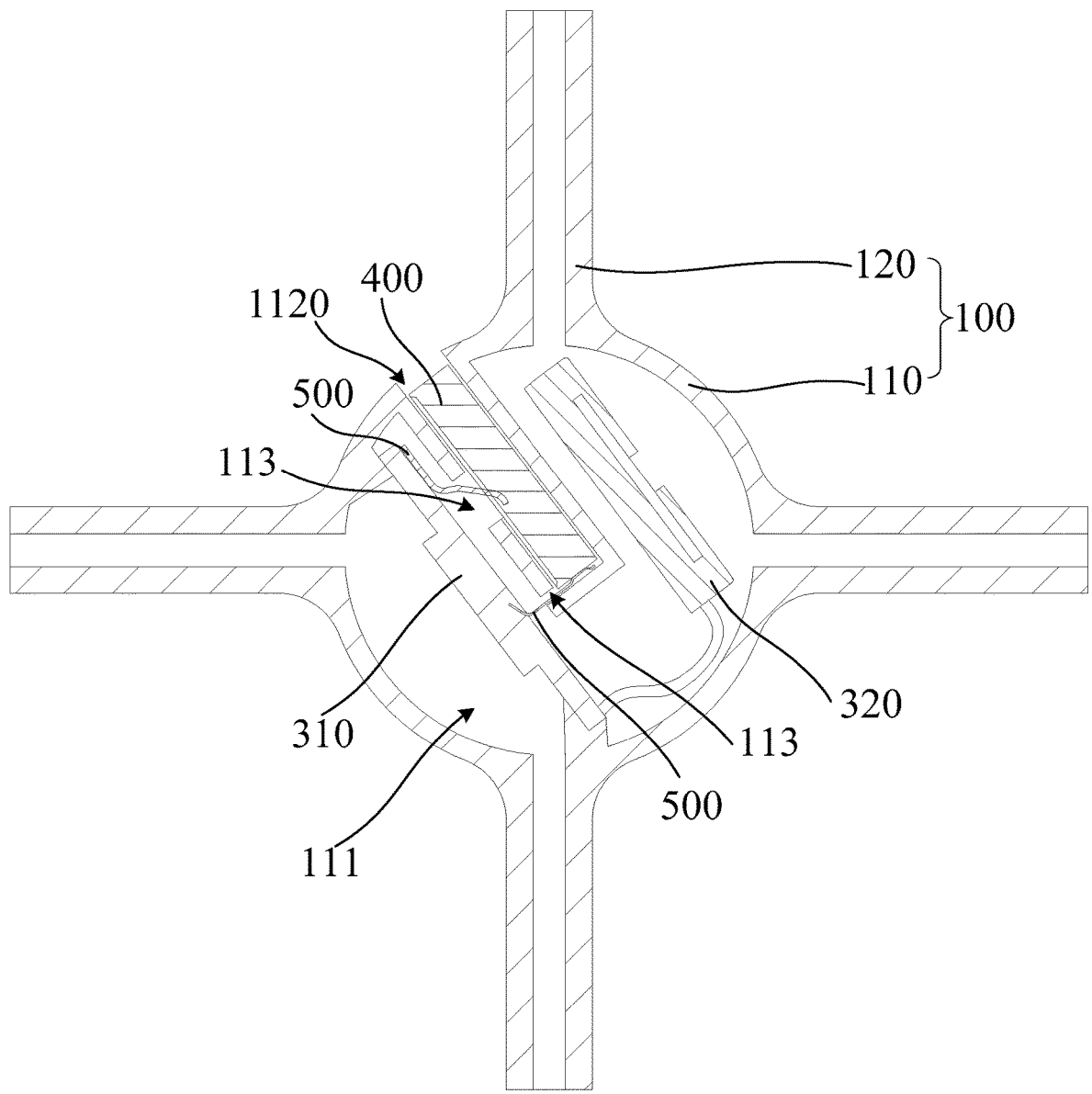
FIG. 12 is a structural schematic view of a smart magic cube according to a second embodiment of the present disclosure.

Specifically, referring to FIG. 12, the battery-replaceable smart center shaft includes the core 100, the sensors 200 and the main control module 310. The core 100 includes the housing 110 with the cavity 111. The main control module 310 is mounted in the cavity 111. The sensors 200 are electrically connected to the main control module 310. The sensors 200 are mounted at the core 100. The sensor 200 is configured to detect the rotation signals of the cube layers. The battery 400 is mounted on the exterior of the housing 110. The housing 110 is provided with a through hole 113 through which the cavity 111 is in communication with the exterior of the housing 110.

In the above battery-replaceable smart center shaft, the sensor 200 is configured to detect the rotation signals of the cube layers of the smart magic cube. The main control module 310 acquires the rotation signals of each of the cube layers via the sensors 200, and calculates the real-time status of the smart magic cube. The battery 400 is detachably mounted on the exterior of the housing 110. One end of the conductive member 500 is electrically connected to the battery 400, and the other end thereof passes through the through hole 113 and then is electrically connected to the main control module 310 located in the cavity 111, such that the battery 400 supplies electrical energy to the main control module 310 and other power-consuming components electrically connected to the main control module 310, so as to ensure the normal use of the smart magic cube. When the power of the smart magic cube is low, the player can remove the old battery 400 and replace it with a new battery 400 to continue using the smart magic cube immediately without battery charging or stopping using the smart magic cube for a period of time, which is convenient for the player to use.

Continuing to refer to FIG. 12, a mounting groove 1120 for accommodating the battery 400 is disposed on the exterior of the housing 110. The battery 400 is detachably disposed in the mounting groove 1120.

Third Embodiment

The difference between the third embodiment and the first embodiment is that the notch 112 is located above the mounting position 114. The battery 400 is vertically mounted on the mounting position 114.

Figure 13:
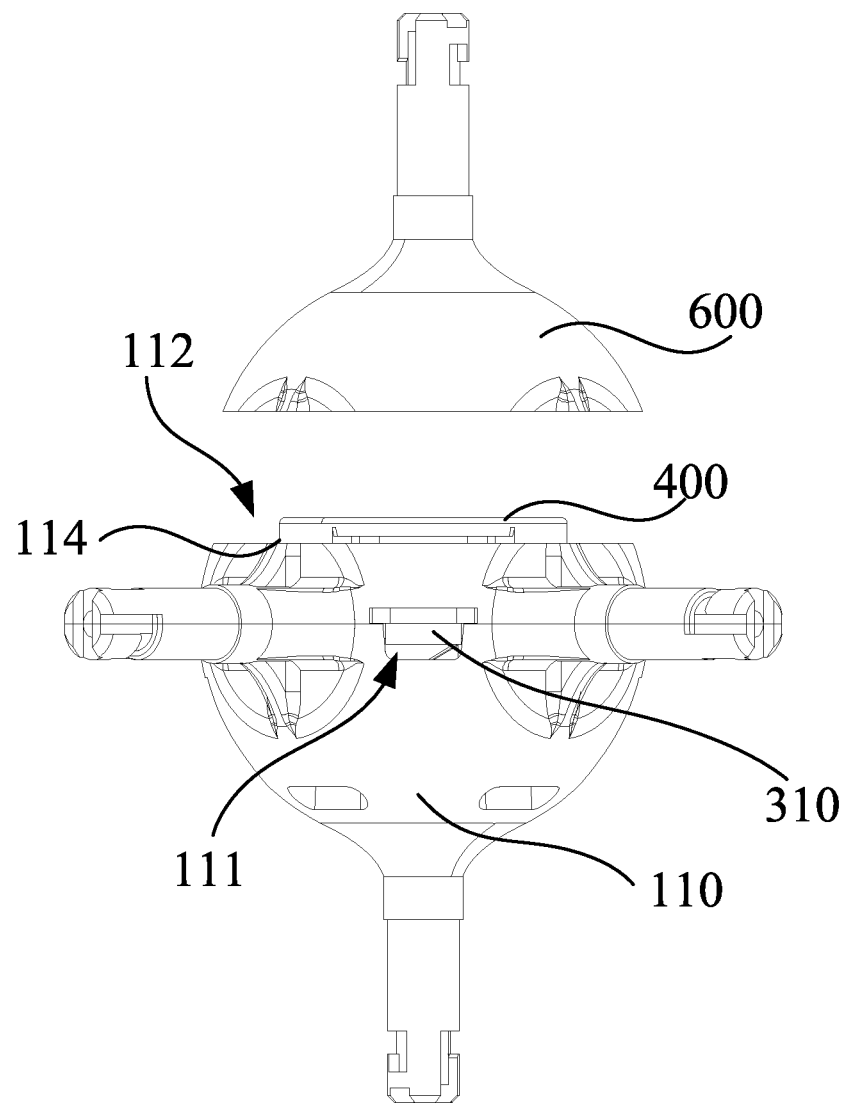
FIG. 13 is a structural schematic view of a battery-replaceable smart center shaft according to a third embodiment of the present disclosure.

Specifically, referring to FIG. 13, the mounting position 114 is disposed in the cavity 111. The housing 110 is provided with the notch 112. The notch 112 is located above the mounting position 114. The battery 400 is vertically mounted on the mounting position 114 through the notch 112.

Fourth Embodiment

The difference between the fourth embodiment and the first embodiment is that the notch 112 and the mounting position 114 are located on the same horizontal plane. The battery 400 is horizontally mounted on the mounting position 114.

Figure 14:
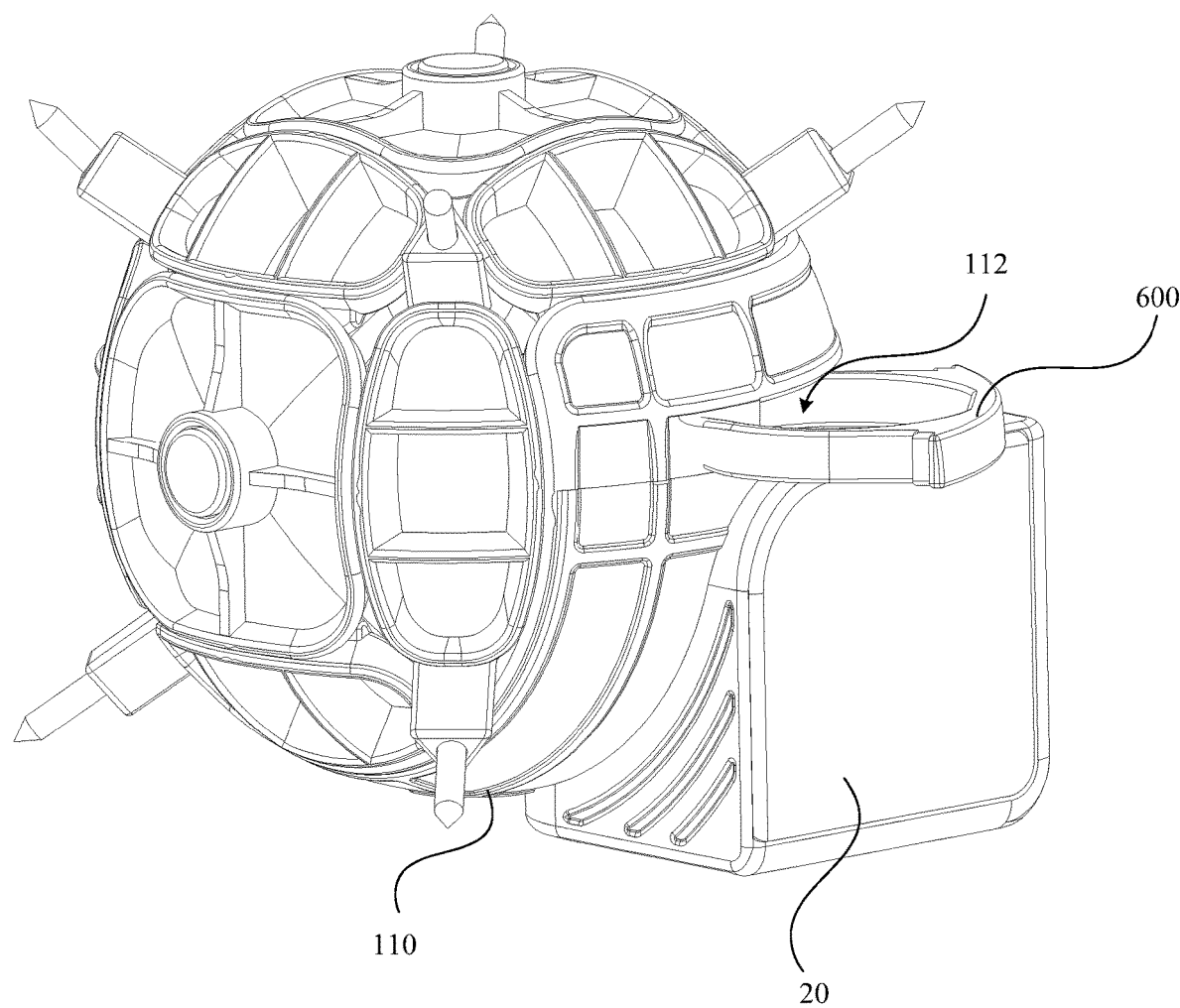
FIG. 14 is a structural schematic view of a smart magic cube according to a fourth embodiment of the present disclosure.

Specifically, referring to FIG. 14, the smart magic cube is a second-order magic cube. Part of the blocks 20 is removed to facilitate observation of the mounting of the battery 400. The notch 112 and the mounting position 114 are located on the same horizontal plane. The battery 400 can be horizontally mounted on the mounting position 114. The battery cover 600 is slidably and retractably disposed at the mounting position 114 to facilitate the replacement of the battery 400.

The technical features of the above-mentioned embodiments can be combined arbitrarily. In order to simplify the description, all possible combinations of the technical features in the above-mentioned embodiments are not described. However, as long as there is no contradiction in the combinations of these technical features, they should be considered to be fallen into the range described in the present specification.

Only several embodiments of the present disclosure are illustrated in the above-mentioned embodiments, and the description thereof is relatively specific and detailed, but it should not be understood as a limitation on the scope of the present disclosure. It should be noted that for those of ordinary skill in the art, without departing from the concept of the present disclosure, several modifications and improvements can be made, which all fall within the protection scope of the present disclosure. Therefore, the protection scope of the present disclosure shall be subject to the appended claims.

What is claimed is:

1. A battery-replaceable smart center shaft, comprising:
   a core;
   a conductive member;
   a sensor; and
   a main control module,
   wherein the core comprises a housing with a cavity, the main control module is mounted in the cavity, the sensor is electrically connected to the main control module, and the sensor is mounted at the core,
   wherein a battery is further mounted in the cavity, the housing is provided with a notch for the battery to pass in and out, and the notch is in communication with the cavity; or the battery is mounted on an exterior of the housing, the housing is provided with a through hole through which the cavity is in communication with the exterior of the housing;
   wherein the conductive member is electrically connected to the battery and the main control module respectively, and the battery supplies electrical energy to the main control module via the conductive member;
   wherein an inner wall of the housing is provided with a slot, and the conductive member is detachably mounted in the slot; and
   wherein the conductive member is provided with a supporting portion and a second elastic sheet for conducting electricity, a top end of the second elastic sheet is provided with an elastic portion for abutting against the main control module or the battery, and a height of a top end of the supporting portion is within an elastic moving range of the elastic portion.

2. The battery-replaceable smart center shaft of claim 1, wherein a mounting position is provided in the cavity for a detachable mounting of the battery, and
   wherein the notch is located directly above the mounting position, such that the battery is capable of being vertically mounted on the mounting position through the notch; or the notch is located obliquely above the mounting position, such that the battery is capable of being obliquely mounted on the mounting position through the notch; or the notch is located on a same horizontal plane as the mounting position, such that the battery is capable of being horizontally mounted on the mounting position through the notch.

3. The battery-replaceable smart center shaft of claim 2, further comprising:
   a battery cover, wherein the battery cover is movably mounted at the notch, and is capable of opening or closing the notch.

4. A battery-replaceable smart center shaft, comprising:
   a core;
   a conductive member;
   a battery cover;
   a sensor; and
   a main control module,
   wherein the core comprises a housing with a cavity, the main control module is mounted in the cavity, the sensor is electrically connected to the main control module, and the sensor is mounted at the core, and
   wherein a battery is further mounted in the cavity, the housing is provided with a notch for the battery to pass in and out, and the notch is in communication with the cavity; or the battery is mounted on an exterior of the housing, the housing is provided with a through hole through which the cavity is in communication with the exterior of the housing;

wherein the conductive member is electrically connected to the battery and the main control module respectively, and the battery supplies electrical energy to the main control module via the conductive member;

wherein a mounting position is provided in the cavity for a detachable mounting of the battery, and wherein the notch is located directly above the mounting position, such that the battery is capable of being vertically mounted on the mounting position through the notch; or the notch is located obliquely above the mounting position, such that the battery is capable of being obliquely mounted on the mounting position through the notch; or the notch is located on a same horizontal plane as the mounting position, such that the battery is capable of being horizontally mounted on the mounting position through the notch;

wherein the notch is located obliquely above the mounting position, a side of the battery cover adjacent to the cavity is provided with an abutting bevel, during a process of the battery cover closing the notch, the abutting bevel abuts against the battery, such that the battery slides along the abutting bevel to the mounting position.

5. The battery-replaceable smart center shaft of claim 3, wherein the battery cover is provided with a first flat surface, when the battery cover closes the notch, the first flat surface abuts against an end surface of the battery.

6. The battery-replaceable smart center shaft of claim 2, wherein the notch is located obliquely above the mounting position, an inner wall of the housing or the conductive member is provided with a first elastic sheet, and the first elastic sheet drives the battery to move from the mounting position to the notch.

7. The battery-replaceable smart center shaft of claim 1, wherein a side wall of the slot is provided with a clamping block, and the clamping block and another side wall of the slot jointly clamp the conductive member.

8. A battery-replaceable smart center shaft, comprising:
a core;
a conductive member;
a sensor; and
a main control module,
wherein the core comprises a housing with a cavity, the main control module is mounted in the cavity, the sensor is electrically connected to the main control module, and the sensor is mounted at the core,
wherein a battery is further mounted in the cavity, the housing is provided with a notch for the battery to pass in and out, and the notch is in communication with the cavity; or the battery is mounted on an exterior of the housing, the housing is provided with a through hole through which the cavity is in communication with the exterior of the housing;
wherein the conductive member is electrically connected to the battery and the main control module respectively, and the battery supplies electrical energy to the main control module via the conductive member; and
wherein the conductive member is provided with a supporting portion and a second elastic sheet for conducting electricity, a top end of the second elastic sheet is provided with an elastic portion for abutting against the main control module or the battery, and a height of a top end of the supporting portion is within an elastic moving range of the elastic portion.

9. The battery-replaceable smart center shaft of claim 1, further comprising the battery, wherein the battery is detachably mounted in the cavity through the notch, the cavity is a spherical cavity, and the battery is mounted in a middle of the spherical cavity.

10. The battery-replaceable smart center shaft of claim 1, further comprising the battery, where the battery is detachably mounted in the cavity through the notch, and the battery is a button battery.

11. A magic cube, comprising blocks and the battery-replaceable smart center shaft of claim 1, wherein the blocks are mounted on the battery-replaceable smart center shaft, the blocks match with each other to form a plurality of cube layers, and the sensor is configured to detect rotation signals of the cube layers.

* * * * *